Aug. 18, 1959  W. J. BLAKE  2,900,036
SAFETY SEAT FOR AUTOMOBILES
Filed June 25, 1957
Fig. 1
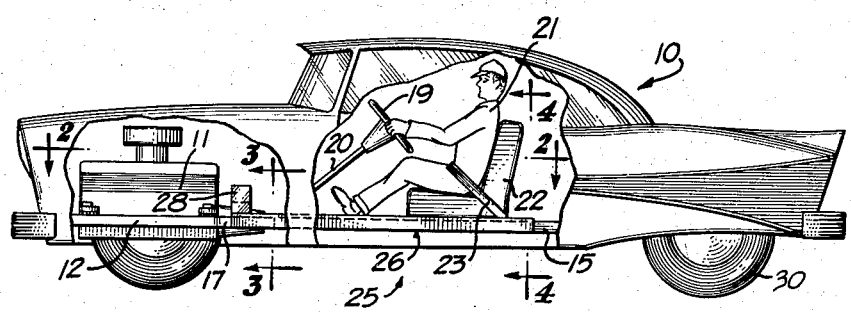
Fig. 2
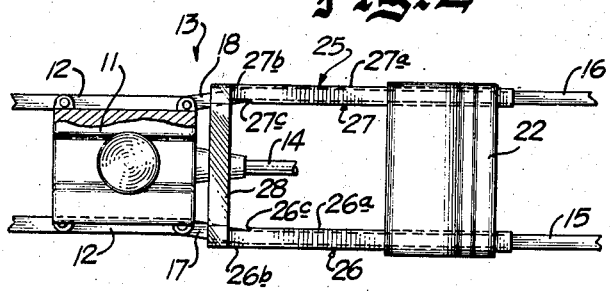
Fig. 3
Fig. 4
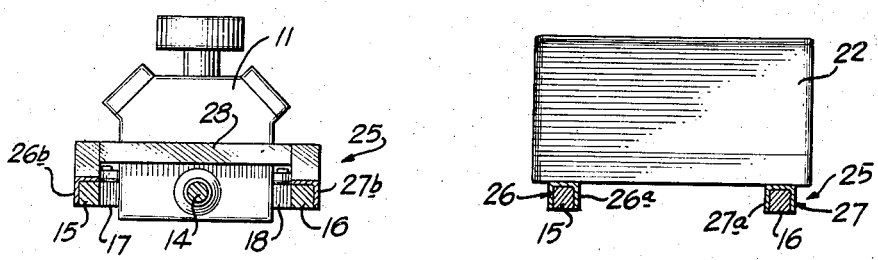
INVENTOR
WILLIAM J. BLAKE
ATTORNEYS.

United States Patent Office 2,900,036
Patented Aug. 18, 1959

2,900,036

SAFETY SEAT FOR AUTOMOBILES

William J. Blake, Chicago, Ill.

Application June 25, 1957, Serial No. 667,885

5 Claims. (Cl. 180—82)

The invention relates generally to a safety seat construction for automobiles or other vehicles, and more particularly to an arrangement of this type which protects the driver and passengers against injury resulting from dislodging the vehicle engine and its steering post from their mountings in the event of an automobile accident.

When an automotive vehicle is involved in a front end collision or similar impact, injuries to the operator or passengers therein are, in a large number of cases, caused by the operator or passenger being struck by the automobile engine or its steering post when the latter devices are forcibly moved rearwardly of the automobile and thrown against the passenger or operator. While the prior art has suggested the use of safety seat belts and other similar constructions to prevent the passenger or operator from being thrown against the windshield or other portions of the vehicle lying adjacent the windshield, no attempt has been made to protect the operator or passengers against the serious injuries resulting from their being struck by the automobile engine or the steering post.

It is an object of the present invention, therefore, to provide a safety seat for automobiles in which the passenger is protected from injuries caused by the rearward movement of the automobile engine or the steering post in the event of an accident.

A further object of the invention is to provide an automobile seat which is adapted to be moved rearwardly of the automobile in the event of a front end collision or similar impact in order to move the passengers or driver out of the path of movement of the automobile engine and the steering post in the event that the latter are dislodged from their mountings.

The foregoing and other objects are realized, in accordance with the present invention, by the provision of a seat support for the front seat of an automobile, which support is mounted for movement rearwardly of the vehicle in the event of an accident. The described rearward movement of the seat support is caused by engagement of the automobile engine with one or more members on the seat support disposed adjacent the engine. Thus, in the event that the engine is forcibly removed from its mounting it contacts the seat support member or members and slides the front seat rearwardly of the automobile, thereby moving the pasengers and the driver out of the path of movement both of the engine and the steering post.

The invention, both as to its organization and method of operation, together with further objects and advantages thereof, will best be understood by reference to the following specification taken in conjunction with the accompanying drawing wherein:

Fig. 1 is a side elevational view of an automobile equipped with the safety seat of the present invention with certain portions of the automobile body being broken away in order to facilitate the illustration;

Fig. 2 is a sectional view taken along a line substantially corresponding to the line 2—2 in Fig. 1;

Fig. 3 is a fragmentary, transverse, sectional view taken along a line substantially corresponding to the line 3—3 in Fig. 1; and Fig. 4 is a fragmentary, transverse, sectional view taken along a line substantially corresponding to the line 4—4 in Fig. 1.

Referring now to the drawing and more particularly to Fig. 1 thereof, the safety seat of the present invention is there shown installed on an automobile of conventional construction indicated generally by the reference numeral 10. This automobile includes the usual engine 11 supported upon engine mounting members 12 forming a part of the chassis 13 of the automobile. The engine 11 is preferably bolted to the members 12 and suitable shock supports are provided to reduce vibration. The engine 11, of course, functions in conventional manner to transmit drive through a shaft 14 to the rear wheels 15 of the automobile.

The chassis 13, in addition to the engine support members 12, may include a pair of longitudinally extending support rails 15 and 16 extending parallel to each other along opposed sides of the automobile. These supports 15 and 16 are connected to the motor support members 12 by means of integral connecting sections 17 and 18 forming a part of the chassis 13.

The automobile 10 further includes a steering wheel 19 and a steering post 20 of conventional construction by means of which a driver 21 is able to steer or guide the front wheels of the vehicle. As illustrated in Fig. 1 the driver is seated upon a front seat 22 of the vehicle and is held against this seat by means of a safety belt 23 of conventional construction. The belt 23 is, of course, secured to the seat and is wrapped around the driver's waist in order to prevent the driver from leaving the seat 22 in the event that the automobile 10 is suddenly stopped either by application of the automobile brakes or by a collision or impact.

In accordance with the present invention the seat 22 is secured in fixed position upon a carriage indicated generally by the reference numeral 25. As is best shown in Fig. 2, the carriage 25 includes a pair of longitudinally extending side rails 26 and 27 interconnected by a front brace 28. The brace 28 may be secured to the rails 26 and 27 in any suitable manner, as for example by bolts or by welding or by both of these means. The side rail 26 may include a channel shaped portion 26a which, as illustrated in Fig. 4, embraces the rail 15 and may further include a forward section 26b of L-shaped cross section, as illustrated in Fig. 3. The rail 27 is identical to the rail 26 and includes a channel shaped portion 27a embracing the rail 16 and a forward portion 27b. The cross brace 28 is, of course, secured to the extreme forward ends of the portions 26b and 27b. The carriage 25 is thus supported upon the rails 15 and 16 for movement in a direction extending rearwardly of the automobile 10 or toward the right as viewed in Figs. 1 and 2. Movement of the carriage toward the left or forwardly of the automobile is prevented by engagement of shoulders 26c and 27c on the rails 26 and 27, respectively, with the connecting portions 17 and 18 of the chassis. The cross brace 28 is disposed adjacent to and just rearwardly of the engine 11 and, accordingly, in the event of a front end collision or other impact which is sufficiently serious to dislodge the engine 11 from the engine support members 12 the engine engages the cross brace 28. Continuous movement of the engine toward the right as viewed in Figs. 1 and 2, produces a corresponding movement of the carriage 25 to the rear of the automobile thus carrying the seat 22 to the rear and moving the driver 21 out of the path of the rearwardly moving engine 11 or the steering post 20. In this manner, injury to the driver or passengers resulting from the rearward movement of the steering post and the engine is avoided.

Frictional engagement between the rails 26 and 27 and the inner rails 15 and 16 normally holds the carriage 25 and the seat 22 in position. In the event that this frictional force is insufficient to prevent inadvertent movement of the seat 22 and the carriage 25 upon application of the automobile brakes or the like, suitable detents acting between each of the members 26 and 27 and the side rails 15 and 16 may be provided although these detents have not been shown in the drawings.

While the carriage 25 has been illustrated as being mounted upon rails forming the sides of the chassis 13, it should be understood that separate seat supporting rails could be employed which would be secured to the chassis. Moreover, the cross brace 28 may be eliminated and the side members 26 and 27 could terminate adjacent the engine so that when the latter is moved rearwardly it would engage the ends of the side members to effect the above-described seat movement.

While the present invention has been shown and described in connection with an illustrative embodiment thereof, it will be understood, of course, that many modifications will readily occur to those skilled in this art and it is therefore contemplated by the appended claims to cover any such modifications as fall within the true spirit and scope of the present invention.

What is claimed as new and desired to be secured by Letters Patent in the United States is:

1. In an automobile of the type driven by an engine secured to a front engine mount, a pair of parallel supporting members extending fore and aft of the automobile, a seat supporting carriage slidably mounted on said supporting members for movement rearwardly of the automobile and including structure disposed adjacent the engine of the automobile so that rearward movement of the engine caused by an accident causes the engine to engage said structure to move the seat supporting carriage rearwardly of the automobile.

2. In an automobile of the type driven by an engine secured to an engine mount at the front of the automobile, supporting structure on the automobile, a seat support slidably mounted on said supporting structure for movement rearwardly of the automobile and including a member engaged by the engine of the automobile to cause sliding movement of the seat support on the supporting structure rearwardly of the automobile only in the event of an accident of sufficient force to dislodge said engine from its mount.

3. In an automobile of the type driven by an engine secured to an engine mount, supporting structure extending fore and aft of the automobile, a seat support slidably mounted on said supporting structure for movement longitudinally of the automobile and including a member disposed adjacent to and rearwardly of the engine of the automobile so that movement of the engine caused by an accident causes said engine to strike said member and, hence, results in sliding movement of the seat support in a direction away from said engine mount.

4. The apparatus defined by claim 1 wherein means are provided for preventing movement of the carriage upon said supporting members forwardly of the automobile.

5. The apparatus defined by claim 2 wherein means are provided for preventing movement of the carriage upon said supporting structure forwardly of the automobile.

References Cited in the file of this patent

UNITED STATES PATENTS

| 2,335,340 | Koppleman | Nov. 30, 1943 |

FOREIGN PATENTS

| 1,122,195 | France | May 14, 1956 |
| 902,348 | Germany | Jan. 21, 1954 |